(12) United States Patent
Kim

(10) Patent No.: US 10,814,660 B2
(45) Date of Patent: Oct. 27, 2020

(54) PRESSURE-SENSITIVE SHEET

(71) Applicant: Jae Bong Kim, Gyeongsangbuk-do (KR)

(72) Inventor: Jae Bong Kim, Gyeongsangbuk-do (KR)

(*) Notice: Subject to any disclaimer, the term of this patent is extended or adjusted under 35 U.S.C. 154(b) by 132 days.

(21) Appl. No.: 15/745,398

(22) PCT Filed: Jul. 19, 2016

(86) PCT No.: PCT/KR2016/007819
§ 371 (c)(1),
(2) Date: Jan. 16, 2018

(87) PCT Pub. No.: WO2017/014522
PCT Pub. Date: Jan. 26, 2017

(65) Prior Publication Data
US 2019/0101462 A1     Apr. 4, 2019

(30) Foreign Application Priority Data

Jul. 23, 2015 (KR) .................. 10-2015-0104534
Jul. 15, 2016 (KR) .................. 10-2016-0090106

(51) Int. Cl.
*B41M 5/03* (2006.01)
*B41M 5/124* (2006.01)

(52) U.S. Cl.
CPC ............ *B41M 5/03* (2013.01); *B41M 5/124* (2013.01)

(58) Field of Classification Search
CPC ................................ B41M 5/03; B41M 5/124
See application file for complete search history.

(56) References Cited

U.S. PATENT DOCUMENTS 3,565,005 A * 2/1971 Knott .................. A63F 3/0685
                                                 101/171
6,411,369 B1 * 6/2002 Suzuki .................... B41J 2/32
                                                 355/400

FOREIGN PATENT DOCUMENTS

| DE | 3711539 A1 * | 10/1988 | .......... A61B 5/1174 |
| DE | 3711539 A1 | 10/1988 | |
| JP | 4-22674 A | 1/1992 | |
| JP | 11-321120 A | 11/1999 | |
| JP | 2005-313534 A | 11/2005 | |
| KR | 10-1998-0048015 A | 9/1998 | |
| KR | 10-1999-0044152 A | 6/1999 | |
| KR | 10-2003-0031261 A | 4/2003 | |

OTHER PUBLICATIONS

International Search Report from the Korean Patent Office in International Application No. PCT/KR2016/007819 dated Oct. 24, 2016.

* cited by examiner

*Primary Examiner* — Gerard Higgins
(74) *Attorney, Agent, or Firm* — The Marbury Law Group, PLLC

(57) ABSTRACT

The present invention relates to a pressure-sensitive sheet having a function which can permanently conserve an indication showing different concentrations according to the intensity of an external pressure applied to pressure-sensitive paper. The pressure-sensitive sheet proposed by the present invention comprises a set of: a pressure-sensitive paper (10) having a surface to which ink (11) is applied; and a transparent film (20) which is disposed on the pressure-sensitive paper (10) and has a rear surface to which an adhesive agent (21) is applied.

3 Claims, 5 Drawing Sheets

[FIG. 1]
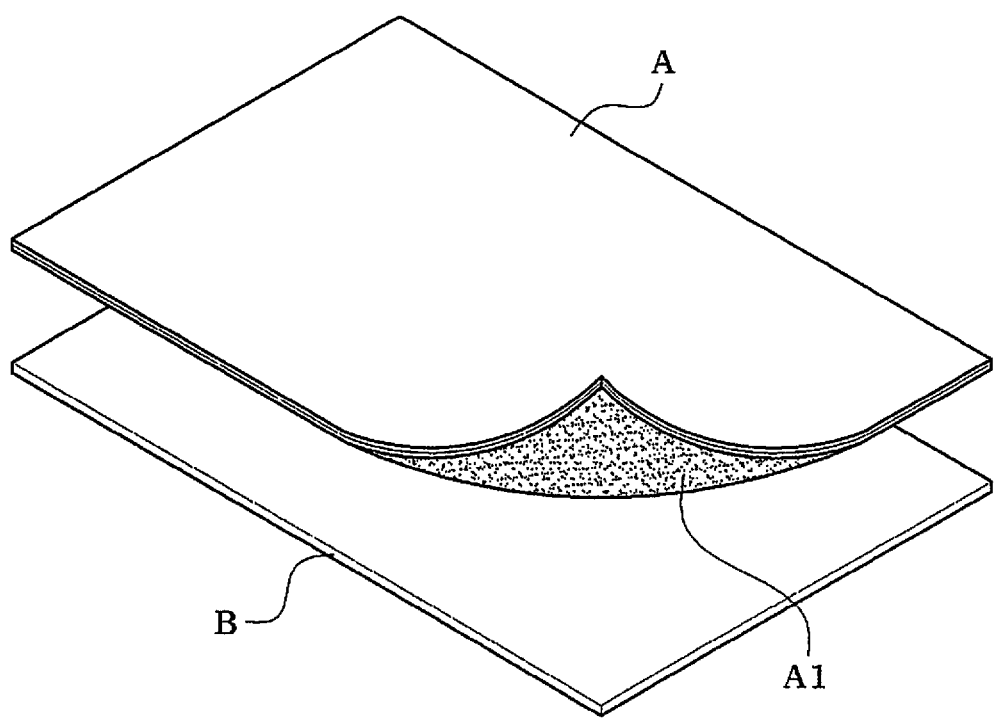

[FIG. 2]
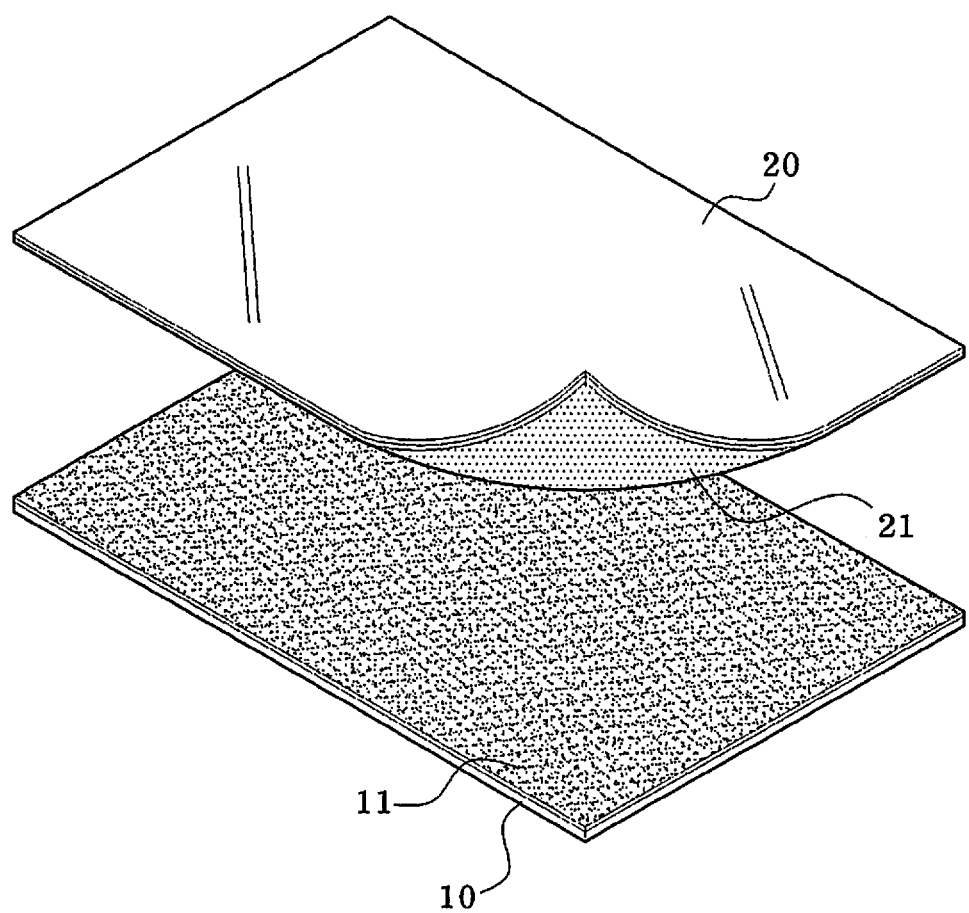

[FIG. 3]
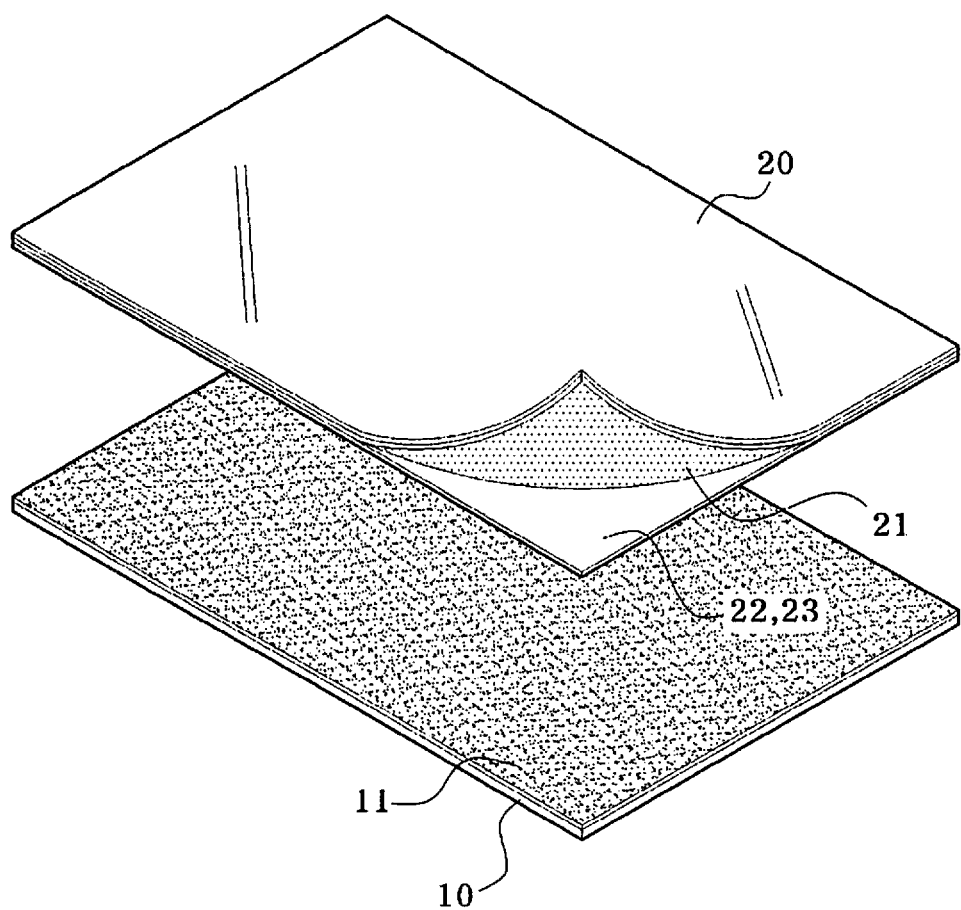

[FIG. 4]
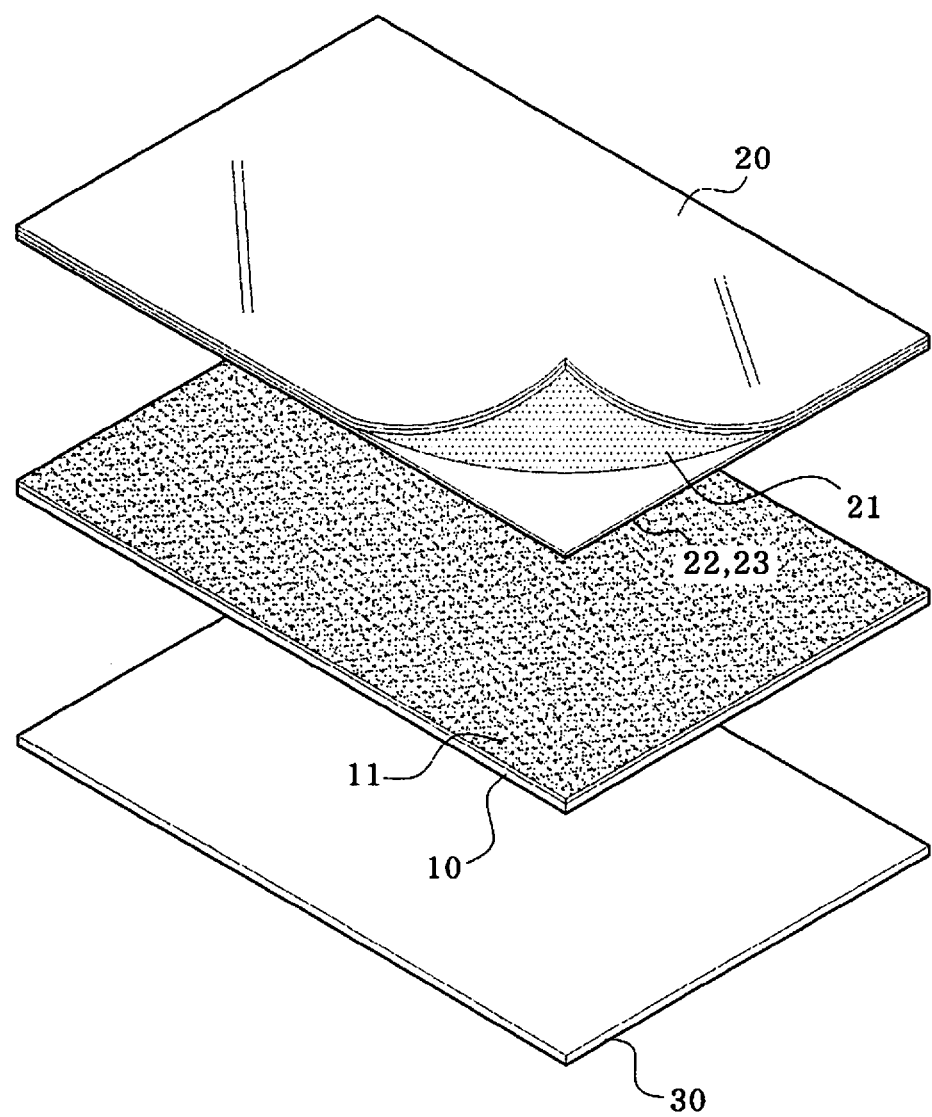

[FIG. 5]
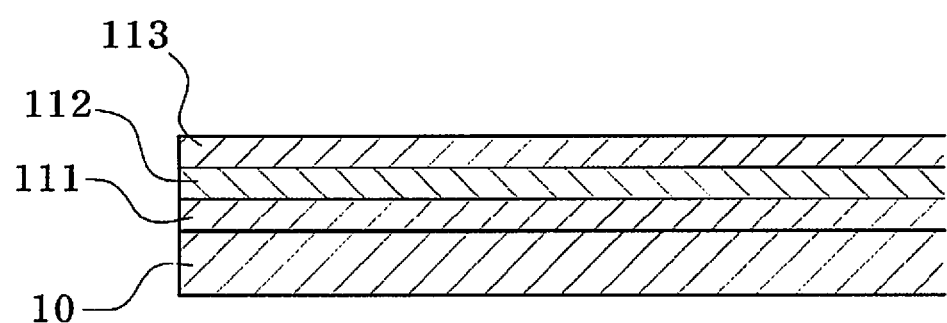

PRESSURE-SENSITIVE SHEET

TECHNICAL FIELD

The present invention relates to a pressure-sensitive sheet with a function which can permanently conserve displaying different colors depending upon intensity of external pressure applied to a pressure-sensitive paper.

BACKGROUND ART

As shown in FIG. 1, a pressure-sensitive sheet typically consists of a set of: a pressure-sensitive paper A having a rear surface to which ink A1 is applied; and a display paper B disposed on the bottom of the pressure-sensitive paper A, wherein the ink A1 applied to the rear surface of the pressure-sensitive paper A is visually observed by looking at a surface of the display paper (hereinafter referred to as "conventional sheet").

When pressure is applied to a surface of the pressure-sensitive paper, the conventional sheet displays ink smear in gat different areas of the display paper to which the pressure was applied, as well as pressure intensities in the areas, or demonstrates a level of the pressure applied thereto while densely smearing. The conventional sheet is frequently used in office supplies, as well as industrial, medical and/or construction applications.

For instance, a pressure-sensitive sheet for industrial use is mostly employed in determining deviation of a press or roller. More particularly, when the pressure-sensitive sheet is placed on a surface of a metal mold in a press followed by applying pressure thereto, or otherwise, when the pressure-sensitive sheet enters between a pair of rollers rotating in engagement with each other, whether ink is evenly spread over and expressed on a surface of a display paper should be frequently checked and the checked result should be stored. Based on the above performance, a mechanical apparatus is maintained and managed such that equal pressure is applied thereto at all times.

However, the conventional sheet has a problem that the ink smeared on the surface of the display paper evaporates over time to thus become gradually faint or become damaged, which in turn causes difficulties in accurately or precisely analyzing long-term statistics or a change in mechanical defects.

DISCLOSURE

Technical Problem

The present invention has been developed to solve the problems mentioned in the background art. That is, in order to overcome these problems, an object of the present invention is to display different concentrations on a transparent film depending upon an intensity of external pressure applied to pressure-sensitive paper and, more particularly, to permanently conserve the display expressed by the pressure-sensitive paper.

Technical Solution

In order to accomplish the above objects, in accordance with one aspect of the present invention, provided is a pressure-sensitive sheet with a technical configuration that includes a transparent film having a rear surface to which adhesive is applied, instead of conventional display paper, so that ink smeared on a pressure-sensitive paper is expressed on the adhesive of the transparent film.

Advantageous Effects

According to the above means, when pressure is applied to a top surface of the transparent film while overlapping the pressure-sensitive paper and the transparent film, the ink of the pressure-sensitive paper may be expressed on the adhesive of the transparent film. According to the above process, the ink of the pressure-sensitive paper may be more clearly visually observed because of the adhesive and, in addition, it is possible to prevent the observed ink from being evaporated and thus lost, or from being forcibly damaged. Therefore, permanent conservation effects are accomplished.

DESCRIPTION OF DRAWINGS

FIG. 1 is a perspective view illustrating a conventional pressure-sensitive sheet;

FIG. 2 is a perspective view illustrating a pressure-sensitive sheet of the present invention;

FIG. 3 is a perspective view illustrating another pressure-sensitive sheet of the present invention;

FIG. 4 is a perspective view illustrating another pressure-sensitive sheet of the present invention; and FIG. 5 is a cross-sectional view illustrating a pressure-sensitive paper of the present invention.

<Description of Symbols>

| | |
|---|---|
| 10: Pressure-sensitive paper | 11: Ink |
| 20: Transparent film | 21: Adhesive |
| 22: Release film | 23: Release paper |
| 30: Conservative paper | 111, 112, 113: Layer |

BEST MODE

Hereinafter, the present invention will be more concretely described with reference to the accompanying drawings. However, in the accompanying drawings, the components may be exaggerated, omitted or schematically illustrated for convenience of explanation. Further, the terms and/or names used in the description may be defined with implication in view of shapes, functions or roles of technical configurations rather than meanings in a commonly-used dictionary. Further, locations or sites would be explained with reference to the drawings unless otherwise specified. In addition, the detailed description of previously registered prior art and commonly known skill and knowledge would be omitted or replaced with simple symbols and/or titles to avoid ambiguous interpretation of essentials of the present invention.

As illustrated in FIG. 2, the pressure-sensitive sheet of the present invention includes a set of: a pressure-sensitive paper 10 having a surface to which ink 11 is applied; and a transparent film 20 disposed on top of the pressure-sensitive paper 10 and having a rear surface to which an adhesive 21 of the transparent film 20 is applied. Comparing the inventive sheet to the conventional sheet, the fundamental configuration of the pressure-sensitive paper 10 is substantially identical to that of the conventional sheet. However, instead of a typical display paper B in the conventional sheet, the transparent film 20 having a rear surface, to which the adhesive 21 of the transparent film 20 is applied, is provided.

With regard to a method of using the pressure-sensitive sheet, unlike the conventional sheet as shown in the drawings, the pressure-sensitive paper 10 is overturned such that an ink-applied surface 11 should face upward, and the transparent film 20 is disposed on top of the pressure-sensitive paper 10, wherein: the pressure-sensitive paper 10 and the transparent film 20 are overlapped to lie one on top of the other while the adhesive-applied surface 21 faces downward; and, in such a state, the ink 11 of the pressure-sensitive paper 10 may be expressed on the adhesive 21 of the transparent film 20 by pressing a top surface of the transparent film 20. Thereafter, if necessary, the pressure-sensitive paper 10 may be removed or reused, while the transparent film 20 including the observed ink 11 may be, for example, attached in a photo album or the like to be stored.

According to the above method of use, since the ink 11 of the pressure-sensitive paper 10 is readily smeared due to a sticky component of the adhesive 21 of the transparent film 20, an area to which the pressure is applied may be more clearly and accurately demonstrated. Further, since the observed ink 11 is entrapped and held in the adhesive 21 of the transparent film 20, it possible to prevent the ink 11 from being naturally volatilized and lost, or otherwise, from being forcibly damaged, thereby efficiently and permanently conserving the same.

Further, the transparent film 20 is formed by integrally coating a transparent film on the top surface of the adhesive 21 of the transparent film 20, so as to more clearly express the observed ink through pressure-sensitive effects, thereby clearly identifying a pressure-sensitive area.

As such, unlike the conventional pressure-sensitive paper A, the pressure-sensitive paper 10 is characterized in that a part smeared with the ink 11 is not the paper but the adhesive 21 of the transparent film 20. For this reason, if a support layer coated with the ink 11 is made of a paper, there is encountered a problem that the support layer is strongly adhered to the adhesive layer and is not be releasable. In order to prevent the above problem, the pressure-sensitive paper 10 may consist of a film rather than a paper, and the ink 11 applied to the pressure-sensitive paper 10 may be spread in powder form. Further, the adhesive 21 of the transparent film 20 applied to the transparent film 20 may comprise an adhesive having slightly reduced adhesion.

As illustrated in FIG. 3, the pressure-sensitive sheet according to the present invention may include a release film 22 or release paper 23 adhered to a rear surface of the adhesive 21 of the transparent film 20.

The release film 22 and the release paper 23 are additional components to prevent the adhesive 21 of the transparent film 20 from sticking to or being stained with other impurities or to protect a display part smeared with the ink 11, which has a smooth surface thus being easily released from the adhesive 21 of the transparent film 20. Further, the release film and release paper may be made of a transparent film to clearly demonstrate the display part smeared with the ink 11 or otherwise an opaque paper.

The release film 22 or release paper 23 may be used as follows: in an ordinary state, the release film or release paper is normally adhered to the rear surface of the transparent film 20; when using the same, that is, before overlapping the pressure-sensitive paper 10 and the transparent film 20, the transparent film 20 is used after peeling off the release film or release paper from the same; and, after use, that is, after the ink 11 of the pressure-sensitive paper 10 is expressed on the adhesive 21 of the transparent film 20, the release film or release paper may be adhered again to the adhesive 21 of the transparent film 20.

According to the above procedure, the ink 11 smeared on the adhesive 21 of the transparent film 20 may be protected from damage and the adhesive 21 of the transparent film 20 may also be protected from other impurities staining the same until the visually observed transparent film containing the ink 11 is stored.

As illustrated in FIG. 4, the pressure-sensitive sheet of the present invention may further include a conservative paper 30 provided at the bottom of the pressure-sensitive paper 10.

The conservative paper 30 has substantially the same configuration as a conventional conservative paper B. However, the conservative paper of the present invention is not provided to be smeared with the ink 11 of the pressure-sensitive paper 10 and, instead, is an alternative component adhered to the adhesive 21 of the transparent film 20 so as to more clearly express the ink smeared on the transparent film 20. A surface of this conservative paper may be well adhered to the adhesive 21 of the transparent film 20 and kept in the adhered state for a long period of time, and may consist of black paper or white paper.

The conservative paper 30 may be used as follows. That is, after applying the ink 11 of the pressure-sensitive paper 10 to the adhesive 21 of the transparent film 20, the transparent film 20 is directly attached to the conservative paper 30 without using the above release film 22 or release paper 23.

According to the above procedure, the transparent film 20 smeared with the ink 11 may be attached to the conservative paper 30 and stored, thereby ensuring easy storage and efficiently reducing the possibility of damaging the ink 11.

As illustrated in FIG. 5, with regard to the pressure-sensitive sheet of the present invention, the ink 11 spread over the surface of the pressure-sensitive paper 10 may comprise different colors to form layers 111, 112 and 113.

These layers 111, 112 and 113 are configured to display different colors depending upon a level of pressure in a pressure-sensitive state and, for example, may include three primary colors such as red, green and blue in descending order from the top.

If these layers 111, 112 and 113 are included, individual colors or a mixture of the colors smeared on the adhesive 21 of the transparent film 20 by pressure applied to the pressure-sensitive paper 10 are expressed. For instance, red at the lowest pressure, green or yellow formed by mixing red and green colors at a moderate pressure, and blue or black formed by mixing three primary colors at the highest pressure may be expressed. As such, expression of the mixed color is mostly demonstrated by applying the colors to a rubbing area. In particular, expression of the mixed color is utilized in industrial applications, such as presses and rollers, and may be useful for identifying pressure deviation.

INDUSTRIAL APPLICABILITY

As such, the present invention has been concretely described above. Persons having ordinary skills in the technical field to which the present invention pertains may sufficiently understand the spirit of the present invention from the detailed description and the accompanying drawings. Based on the same, various modifications and alterations are possible and industrially applicable.

The invention claimed is:
1. A pressure-sensitive sheet comprising a set of:
a pressure-sensitive paper having a surface to which ink has been applied; and
a transparent film that is disposed on top of the pressure-sensitive paper and has a bottom surface to which an adhesive has been applied, wherein the pressure-sensitive paper and the transparent film are overlapped to lie one on top of the other so as to express the ink of the pressure-sensitive paper on the adhesive of the transparent film when pressure is applied to a top surface of the transparent film, wherein a conservative paper is separately provided on a bottom surface of the pressure-sensitive paper, wherein the expressed ink is conserved by attaching the transparent film having the expressed ink to the conservative paper.

2. The pressure-sensitive sheet according to claim 1, wherein a release film or release paper is adhered to a bottom surface of the adhesive of the transparent film so as to protect the adhesive and the ink that can be expressed on the adhesive.

3. The pressure-sensitive sheet according to claim 1, wherein the ink applied to the surface of the pressure-sensitive paper is formed as separate layers having different colors, wherein the separate layers display different colors depending upon a level of the pressure applied to the pressure-sensitive paper.

\* \* \* \* \*